US007022941B2

(12) United States Patent
Joseph et al.

(10) Patent No.: US 7,022,941 B2
(45) Date of Patent: Apr. 4, 2006

(54) DEVICE FOR REDUCING THE ABLATION PRODUCTS ON THE SURFACE OF A WORK PIECE DURING LASER DRILLING

(75) Inventors: Bertrand Joseph, Florange (FR); Johannes Wais, Schwieberdingen (DE); Gert Callies, Buehl (DE); Ulrich Graf, Bietigheim-Bissingen (DE); Beatrice Gebhard, Ludwigsburg (DE); Andreas Dauner, Waldachtal (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 10/486,537

(22) PCT Filed: Jul. 9, 2002

(86) PCT No.: PCT/DE02/02501

§ 371 (c)(1),
(2), (4) Date: Aug. 25, 2004

(87) PCT Pub. No.: WO03/015977

PCT Pub. Date: Feb. 27, 2003

(65) Prior Publication Data

US 2005/0006362 A1 Jan. 13, 2005

(30) Foreign Application Priority Data

Aug. 8, 2001 (DE) ................................ 101 38 867

(51) Int. Cl.
*B23K 26/14* (2006.01)
*B23K 26/38* (2006.01)

(52) U.S. Cl. .............................. 219/121.84; 219/121.7

(58) Field of Classification Search ........... 219/121.84, 219/121.7, 121.71
See application file for complete search history.

(56) References Cited

U.S. PATENT DOCUMENTS

| | | | | |
|---|---|---|---|---|
| 4,319,120 | A * | 3/1982 | la Rocca | 219/121.84 |
| 5,756,962 | A * | 5/1998 | James et al. | 219/121.75 |
| 6,118,097 | A | 9/2000 | Kaga et al. | |
| 6,204,475 | B1 * | 3/2001 | Nakata et al. | 219/121.84 |
| 6,492,617 | B1 * | 12/2002 | Nagahori et al. | 219/121.84 |
| 6,507,000 | B1 * | 1/2003 | Otsubo et al. | 219/121.7 |
| 6,538,232 | B1 * | 3/2003 | Lambert | 219/121.84 |
| 6,649,867 | B1 * | 11/2003 | Rippl et al. | 219/121.84 |
| 6,667,459 | B1 * | 12/2003 | Woods et al. | 219/121.84 |
| 2004/0245226 | A1 * | 12/2004 | Callies et al. | 219/121.71 |

FOREIGN PATENT DOCUMENTS

| | | |
|---|---|---|
| DE | 38 22 097 | 1/1990 |
| DE | 40 05 453 | 8/1991 |
| DE | 40 37 211 | 5/1992 |
| DE | 299 80 010 U1 | 1/2000 |
| EP | 0 618 037 | 10/1994 |
| EP | 1 145 796 | 10/2001 |
| JP | 10 225 787 | 8/1998 |
| WO | 93 16838 | 9/1993 |
| WO | 01 45893 | 6/2001 |

* cited by examiner

*Primary Examiner*—Geoffrey S. Evans
(74) *Attorney, Agent, or Firm*—Kenyon & Kenyon

(57) ABSTRACT

A device for introducing holes into a workpiece has a laser beam source for producing at least one laser beam which may be directed toward the workpiece. A nozzle system is provided having at least one nozzle which may have a gas under pressure applied to it, the gas flow exiting the nozzle being aligned in relation to the workpiece surface in such a way that molten particles detached from the workpiece are guided away from the hole produced by the laser beam.

10 Claims, 2 Drawing Sheets

DEVICE FOR REDUCING THE ABLATION PRODUCTS ON THE SURFACE OF A WORK PIECE DURING LASER DRILLING

FIELD OF THE INVENTION

The present invention relates to a device for introducing holes into workpieces, which has a laser beam source for producing at least one laser beam which may be directed toward the workpiece.

BACKGROUND INFORMATION

Prior devices are used for the purpose of introducing holes, boreholes, for example, into a workpiece with the aid of a laser beam. For this purpose, the laser beam is directed toward the workpiece surface. In this case, the material of the workpiece is locally heated, melted, and partially vaporized by the high intensity of the laser beam. The molten metal is driven out of the borehole produced by the relatively high vapor pressure. Due to the high kinetic energy of the molten metal, molten metal droplets separate at the edge of the hole. These cool down in the medium surrounding the borehole, such as the surrounding air, and partially accumulate together with the condensed vapor on the workpiece surface. As a function of the kinetic energy of these particles, their temperature, and the medium surrounding the borehole, a coating made of ablation products, some of which adheres firmly, results on the workpiece surface, which is not desirable. The particle deposition may make complex and costly reprocessing of the workpiece necessary.

If a conventional protective gas nozzle is used, whose gas flow runs coaxially to the laser beam to protect the optical device from the molten particles rising from the hole edge and the condensed metal vapor, the molten particles are deflected by this gas beam, which is directed perpendicularly toward the workpiece surface, and pressed back onto the workpiece surface, which favors the undesired adhesion of the particles on the workpiece surface.

SUMMARY OF THE INVENTION

In contrast, the device according to the present invention offers the advantage that particle deposition forming on the workpiece surface is significantly reducible in relation to the known device. In this way, the complex and costly reprocessing of the workpiece may be reduced or possibly even dispensed with entirely. This is achieved with the aid of a nozzle system having at least one nozzle which may have a gas under pressure applied to it, the gas flow exiting the nozzle being able to be aligned in relation to the workpiece surface in such a way that molten particles detached from the workpiece are guided away from the hole produced by the laser beam, i.e., from the workpiece.

In a preferred embodiment, the hole produced by the laser beam is a borehole. This borehole may penetrate the workpiece or a wall thereof, i.e., it may be a through borehole, or it may be implemented as a pocket borehole. Greatly varying hole shapes may be implemented using the laser beam, so that the present invention is not restricted to circular holes/boreholes.

In an advantageous exemplary embodiment of the device, the nozzle system has a modified protective gas nozzle, which may have a protective gas under pressure applied to it, to protect an optical device from molten particles. In this case, the protective gas flow has a double function. It is used both for protecting the optical device from the molten particles and the condensed metal vapor, and for removing these molten particles, which are detached from the workpiece, from the borehole.

In a preferred embodiment of the device, the protective gas nozzle is situated coaxially or eccentrically to the laser beam, its geometry being selected in such a way that the protective gas flow incident on the workpiece surface guides the particles detached from the workpiece away from the hole produced by the laser beam and thus simultaneously protects the optical device. The protective gas nozzle is thus implemented in such a way that the protective gas flow surrounds the laser beam in the region near the nozzle and is deflected before its incidence on the workpiece surface in such a way that the protective gas flow has at least one directional component running parallel to the workpiece surface. In other words, the protective gas flow is not incident on the workpiece surface orthogonally, but rather at an angle smaller than 90°.

Furthermore, an exemplary embodiment of the device is preferred which is characterized in that the nozzle system has at least one transverse flow nozzle which may have a process gas under pressure applied to it, the process gas flow exiting the transverse flow nozzle having at least one directional component running parallel to workpiece surface in the region of the hole produced by the laser beam. The molten particles detached from the workpiece surface are caught up by the process gas flow and guided away from the hole. In this exemplary embodiment, the molten particles are guided away from the hole exclusively by the process gas flow, i.e., a protective gas flow is not necessary in this case and is also not provided.

A further exemplary embodiment of the present invention is also preferred, which is characterized in that the nozzle system includes a protective gas nozzle and at least one transverse flow nozzle, the protective gas flow exiting the protective gas nozzle being directed perpendicularly or essentially perpendicularly to the workpiece surface and the transverse flow nozzle being aligned in relation to the protective gas nozzle in such a way that the protective gas flow is deflected away from the workpiece surface by the process gas flow, so that perpendicular incidence of the protective gas flow on the workpiece surface is prevented. A resulting gas flow arises from the protective gas flow and the process gas flow, which picks up the molten particles detached from the workpiece and guides them away from the workpiece and/or from the hole produced by the laser beam. This means that the resulting gas flow has at least one directional component which is parallel to the workpiece surface in the region of the hole.

According to a refinement of the present invention, the nozzle system has a protective gas nozzle whose geometry is selected in such a way that the protective gas flow exiting the protective gas nozzle may initially run coaxially or eccentrically to the laser beam and—before it is incident on the workpiece surface—is deflected in such a way that it has at least one directional component running parallel to the workpiece surface and guides the molten particles detached from the workpiece away from the hole. Furthermore, the nozzle system additionally has at least one transverse flow nozzle, which is aligned in relation to the protective gas flow in such a way that the process gas flow exiting the transverse flow nozzle has at least one directional component running parallel to the workpiece surface in the region of the hole produced by the laser beam and meets the protective gas flow, which has already been deflected due to the geometry of the protective gas nozzle, in the region of the hole. The protective gas and process gas flows combine into a resulting gas flow which guides the molten particles detached from the workpiece away from the hole. The directional components of the protective gas flow and the process gas flow running parallel to the workpiece surface are equidirectional before their combination into the resulting gas flow. In this exemplary embodiment of the device, the process gas flow is capable, above all due to its flow direction, of ensuring reliable removal of the molten particles detached from the workpiece. A requirement for this in each case is an appropriate volume flow and pressure of the gas flow. The protective gas flow essentially assumes the function of protecting the optics from ablation products in this case. This exemplary embodiment of the device is characterized by particularly high functional reliability.

In an advantageous exemplary embodiment of the device, the process gas flow exiting the transverse flow nozzle is directed in a movement direction of the surface of the workpiece, which executes a relative movement in relation to the nozzle system. The workpiece can, for example, be a cylindrical component, such as a roller or drum, which is driven to rotate around its longitudinal central axis and may preferably also be moved translationally in all three spatial directions. In this case, the process gas flow is directed in the rotational direction of the cylindrical component. The air layer entrained by the outer surface of the cylindrical component also has a reinforcing effect in removing the molten particles from the hole.

Finally, an exemplary embodiment of the device is preferred in which the volume flow and/or the pressure of the process gas and/or the protective gas are adjustable. In this way, optimum adjustment of the gas flows for the removal of the molten particles is possible.

It is clear that the device described above is particularly suitable for high-speed laser boring operations.

DETAILED DESCRIPTION

Figure 1:
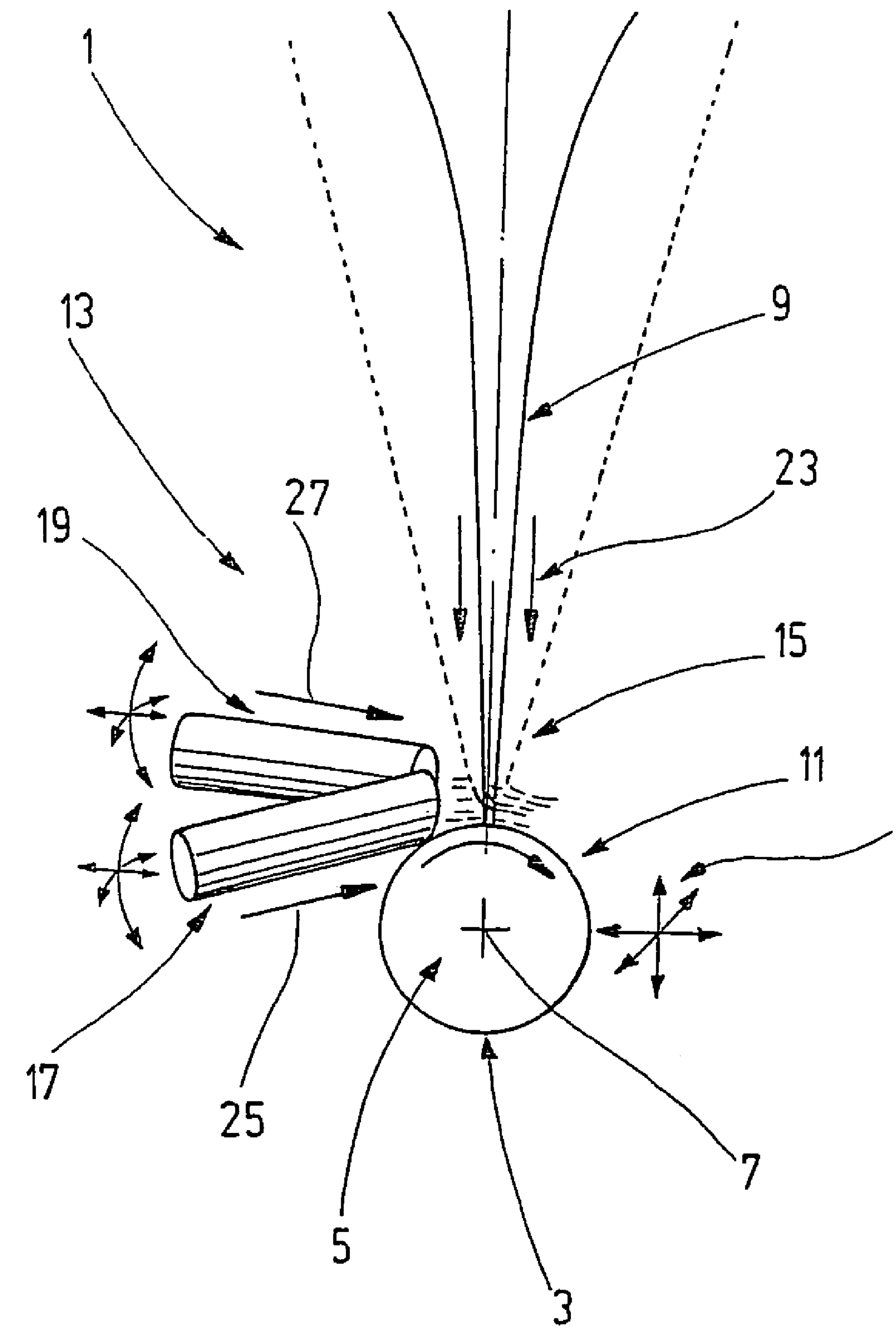
FIG. 1 shows a detail of the device according to the present invention in a side view.

FIG. 1 shows a schematic illustration of a detail of a device 1 for producing holes, boreholes in particular, in a workpiece 3. Workpiece 3 is shown here for exemplary purposes in the form of a cylindrical component 5, which may have a torque applied to it using a drive device (not shown) for rotation around its longitudinal central axis 7. Cylindrical component 5 is driven clockwise here, for example, as indicated by an arrow.

Device 1 includes a laser beam source (not shown) for producing at least one laser beam 9, indicated in FIG. 1 using an arrow, which may be directed toward workpiece 3. The construction and function of the laser beam source is known per se, so that it will not be described in greater detail here.

In the exemplary embodiment shown in FIG. 1, laser beam 9 is aligned in such a way that it is incident perpendicularly on the external lateral surface 11 of cylindrical component 5. It is also possible, of course, to align laser beam 9 in relation to component 5 in such a way that it is incident on the component surface at an angle which is not equal to 90°.

Device 1 also has a nozzle system 13, which includes a protective gas nozzle 15 and—in this exemplary embodiment—two transverse flow nozzles 17 and 19. Protective gas nozzle 15 is positioned coaxially or eccentrically to laser beam 9 and is implemented in the shape of a truncated cone, the cross-section of protective gas nozzle 15 tapering in the direction toward workpiece 3. The discharge region of protective gas nozzle 15 is positioned at only a slight distance to external lateral surface 11 of cylindrical component 5, the distance between protective gas nozzle 15 and component 5 being adjustable using an actuator (not shown), as indicated in the figure using a double arrow 21.

Protective gas nozzle 15 is connected to a first gas supply device (not shown), using which protective gas nozzle 15 may have a protective gas under pressure applied to it. Protective gas flow 23 inside protective gas nozzle 15 is indicated with arrows. The nozzle geometry is selected and the protective gas is guided in such a way that the protective gas, i.e., the protective gas flow surrounds laser beam 9.

Transverse flow nozzles 17, 19, illustrated in simplified form as tubular formations, are positioned upstream from protective gas nozzle 15—viewed in the rotational direction of cylindrical component 5. They are connected to a second gas supply device (not shown), using which they may each have a process gas under pressure, preferably the same process gas, applied to them; other gases may also be used. Process gas flows 25, 27 are each indicated using an arrow. Transverse flow nozzles 17, 19 are positioned one behind the other—seen in the direction of longitudinal central axis 7 of cylindrical component 5—and may be brought into any arbitrary position within the space using an actuator (not shown here) for the purpose of aligning process gas flows 25, 27 exiting transverse flow nozzles 17, 19 independently of one another, as indicated using arrows.

In the exemplary embodiment shown in FIG. 1, transverse flow nozzles 17, 19 are positioned in such a way that their discharge region is at a slight distance from the discharge region of protective gas nozzle 15. Process gas flows 25, 27 exiting transverse nozzles 17, 19 run parallel to an imaginary horizontal line, i.e., transversely or essentially transversely to protective gas flow 23, and meet approximately in the discharge region of protective gas nozzle 15 and, at the same time, wet an area of external lateral surface 11 of cylindrical component 5 in which the hole is bored/melted out using laser beam 9. In this way, protective gas flow 23 exiting protective gas nozzle 15 is deflected laterally away from external lateral surface 11 of cylindrical component 5, so that it may not be incident perpendicularly on external lateral surface 11. In this case, process gas flows 25, 27 combine with protective gas flow 23 into a resulting gas flow which is directed parallel or essentially parallel to external lateral surface 11 in the region of the hole produced by laser beam 9. Process gas flows 25, 27 and protective gas flow 23 entrain material particles melted by laser beam 9 and detached from external lateral surface 11 and guide them laterally away from cylindrical component 5. In this way, accumulation of these particles on external lateral surface 11 is advantageously prevented, or at least significantly reduced in relation to known devices. Complex and costly reprocessing of workpiece 3 may possibly be dispensed with entirely here.

It is to be noted that process gas flows 25, 27 blown out of transverse flow nozzles 17, 19 have a double function. They prevent the perpendicular incidence of protective gas flow 23 on external lateral surface 11, in that they deflect it laterally, and they also guide the molten particles away from cylindrical component 5.

It is clear that in specific cases only one of transverse flow nozzles 17, 19 may be sufficient in order to deflect protective gas flow 23 laterally away from workpiece 3 and, at the same time, also to transport the molten particles away from the workpiece. Of course, more than two transverse flow nozzles may also be used, three or four transverse flow nozzles, for example. The transverse flow nozzles may be manufactured cost-effectively. It is also advantageous that existing devices may be retrofitted with the transverse flow nozzles.

Nearly any gas, even air, for example, may be used as the process gas which is placed under pressure and fed to the transverse flow nozzles. The construction of device 1 may be simplified, for example, in that both protective gas nozzle 15 and transverse flow nozzles 17, 19 have protective gas under pressure applied to them, so that all nozzles of nozzle system 13 are supplied with gas by a shared gas supply device.

Figure 2:
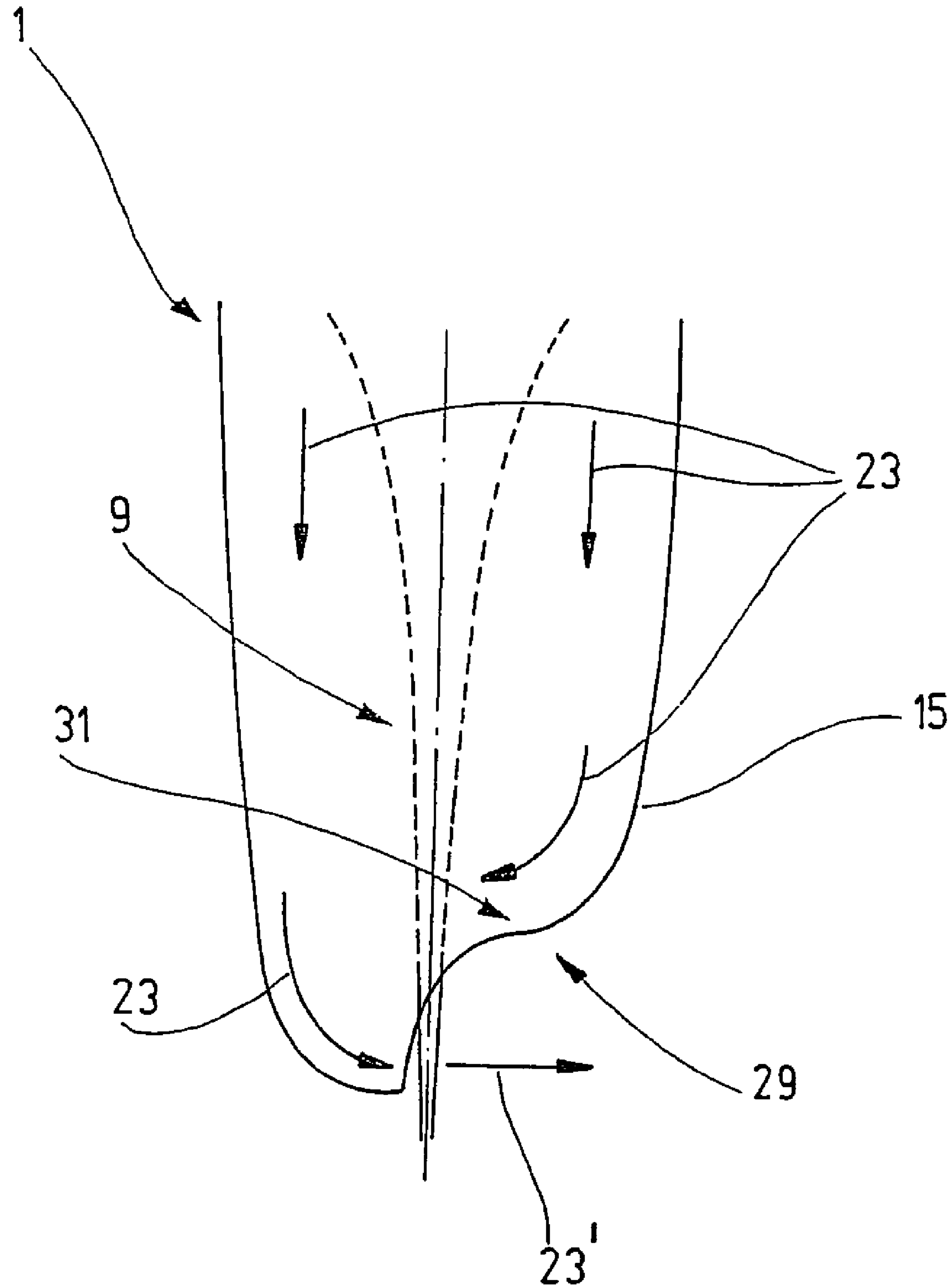
FIG. 2 shows a second embodiment of a protective gas nozzle.

FIG. 2 shows a second exemplary embodiment of nozzle system 13, which has a protective gas nozzle 15 and is different from protective gas nozzle 15 described on the basis of FIG. 1 in that it has a blocking device 29, which prevents free outflow of protective gas flow 23, which runs coaxially or eccentrically to laser beam 9 in the upstream region of protective gas nozzle 15, in its discharge region in the vicinity of workpiece 3 to be processed (not shown). Blocking device 29, which influences at least one part of, and preferably the entire protective gas flow 23, is implemented in this exemplary embodiment as a baffle device 31, which deflects protective gas flow 23 surrounding laser beam 9 by approximately 90° in relation to laser beam 9, so that the protective gas flow exiting protective gas nozzle (15) preferably runs parallel or essentially parallel to the workpiece surface, as indicated by an arrow 23'. Baffle device 31 may, of course, also be implemented in such a way that protective gas flow 23' exiting protective gas nozzle 15 is incident on the workpiece surface at an acute angle. In any case, the protective gas flow is guided in such a way that the particles detached from workpiece 3 are guided away, preferably in order to prevent accumulation of the particles on the workpiece, but at least to reduce it in relation to known devices.

Baffle device 31 is produced here in one piece with protective gas nozzle 15, which is implemented in that sections of the lateral surface of protective gas nozzle 15 are drawn inward radially in the discharge region up to approximately the middle of protective gas nozzle 15. Baffle device 31 is implemented here in such a way that the cross-section of protective gas nozzle 15 which may have a free flow through it is made smaller in the discharge region.

Of course, it is possible to implement baffle device 31 and protective gas nozzle 15 as individual components which are separable from one another. In this case, the reduced number of variants of protective gas nozzle 15 would be advantageous, of which possibly only one basic form would be provided, a desired protective gas flow guiding being adjustable through the use of an appropriately implemented baffle device 31.

In nozzle system 13 described with reference to FIG. 2, transverse flow nozzles 17, 19, as they were described on the basis of FIG. 1, would not be necessary in all cases. This means that the protective gas flow guiding implemented using the protective gas nozzle geometry according to the present invention, in which protective gas flow 23 exiting protective gas nozzle 15 has a direction transverse to laser beam 9, may already be sufficient by itself to reduce ablation products on the workpiece surface.

It is to be noted that it is possible to use protective gas nozzle 15 described with reference to FIG. 2 in combination with nozzle system 13, which has transverse flow nozzles 17, 19, described with reference to FIG. 1. In this way, because protective gas flow 23 is already deflected in the region of protective gas nozzle 15 by baffle device 31, the function of the transverse flow nozzles, namely the lateral guiding of the particles away from the borehole, is supported.

Devices 1 described in the introduction to the description and with reference to FIGS. 1 and 2 are also usable for producing holes in a workpiece which has a flat surface and/or has a fixed position in relation to device 1, at least at the moment of production of the hole.

What is claimed is:

1. A device for introducing a hole into a workpiece, comprising:

a laser beam source for producing at least one laser beam that may be directed toward the workpiece; and a nozzle system including at least one nozzle and being capable of having a gas under pressure applied thereto, a gas flow exiting the at least one nozzle being aligned in relation to a surface of the workpiece in such a way that molten particles detached from the workpiece are guided away from the hole produced by the at least one laser beam;

wherein the nozzle system includes at least one transverse flow nozzle and a protective gas nozzle, the transverse flow nozzle aligned in relation to the protective gas nozzle to deflect a protective gas flow away from a workpiece surface by a process gas to prevent a perpendicular incidence of the protective gas flow on the workpiece.

2. The device as recited in claim 1, wherein:

the protective gas nozzle is arranged for protecting an optical device and is capable of having a protective gas under pressure applied thereto.

3. The device as recited in claim 2, further comprising:

a blocking device for preventing a free outflow of at least a part of the protective gas flow and provided in a discharge region of the protective gas nozzle.

4. The device as recited in claim 2, wherein:

the protective gas nozzle is positioned one of coaxially and eccentrically to the at least one laser beam, a geometry of the protective gas nozzle being selected in such a way that the protective gas flow incident on the workpiece surface guides the molten particles detached from the workpiece away from the hole.

5. The device as recited in claim 4, wherein:

the at least one transverse flow nozzle capable of having the process gas under pressure applied thereto, a process gas flow exiting the at least one transverse flow nozzle having at least one directional component that is parallel to the workpiece surface.

6. The device as recited in claim 5, wherein:

the at least one transverse flow nozzle is aligned in relation to the protective gas nozzle in such a way that the protective gas flow is deflected away from the workpiece surface by the process gas flow.

7. The device as recited in claim 5, wherein:

the process gas flow exiting the at least one transverse flow nozzle is directed in a movement direction of the surface of the workpiece and executes a relative movement in relation to the nozzle system.

8. The device as recited in claim 5, wherein:

at least one of a volume flow and a pressure of at least one of the process gas and the protective gas is adjustable.

9. A device for introducing a hole into a workpiece, comprising:

a laser beam source for producing at least one laser beam that may be directed toward the workpiece;

a nozzle system including at least one nozzle and being capable of having a gas under pressure applied thereto, a gas flow exiting the at least one nozzle being aligned in relation to a surface of the workpiece in such a way that molten particles detached from the workpiece are guided away from the hole produced by the at least one laser beam; and a blocking device for preventing a free outflow of at least a part of a protective gas flow and provided in a discharge region of the protective gas nozzle;

wherein the blocking device includes a baffle device for the protective gas flow, the blocking device deflecting the protective gas flow surrounding the at least one laser beam in such a way that the protective gas flow is directed toward the workpiece surface at an angle not equal to 90°.

10. The device as recited in claim 9, wherein:

the protective gas flow is directed essentially parallel toward the workpiece surface.

* * * * *